UNITED STATES PATENT OFFICE.

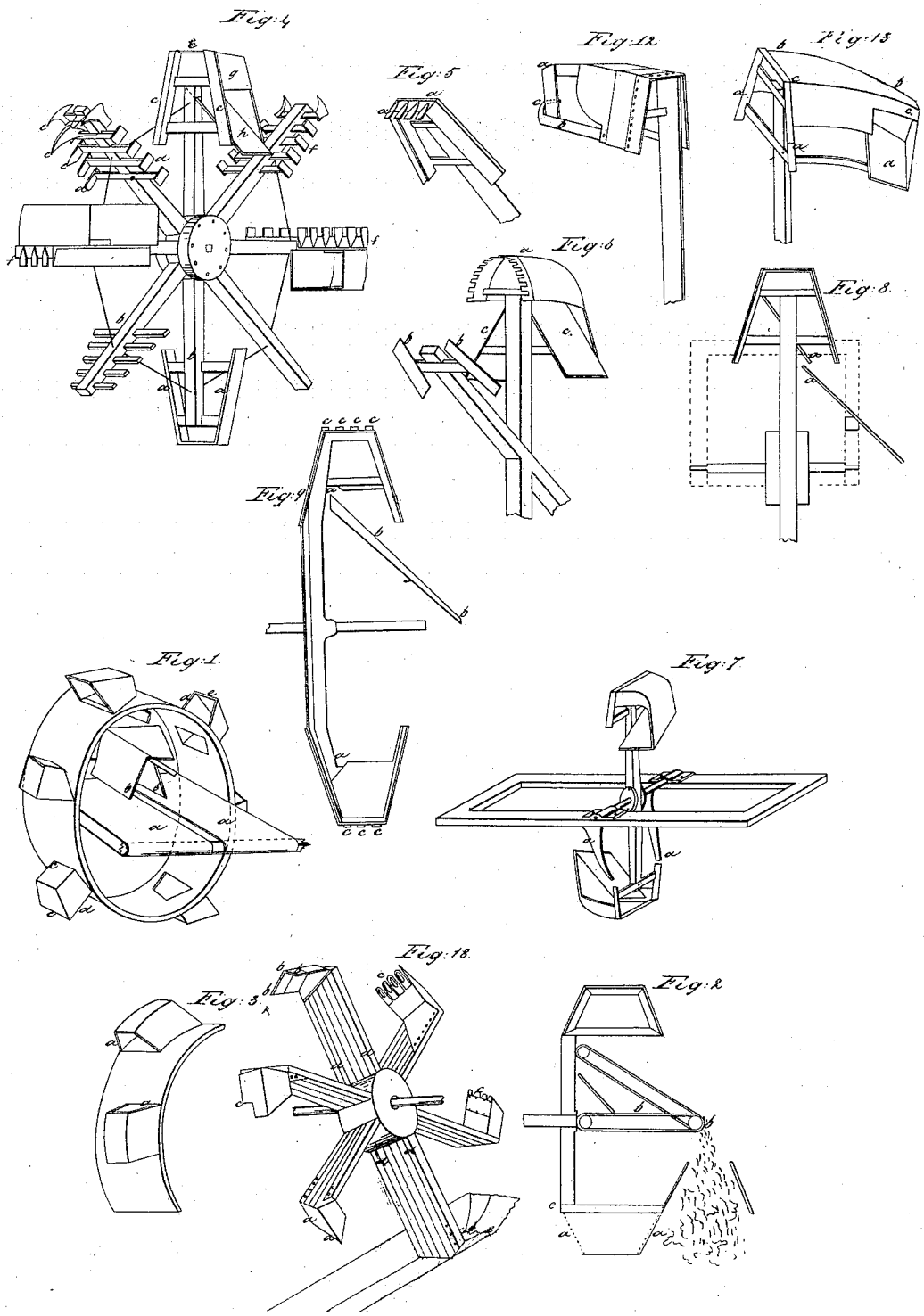

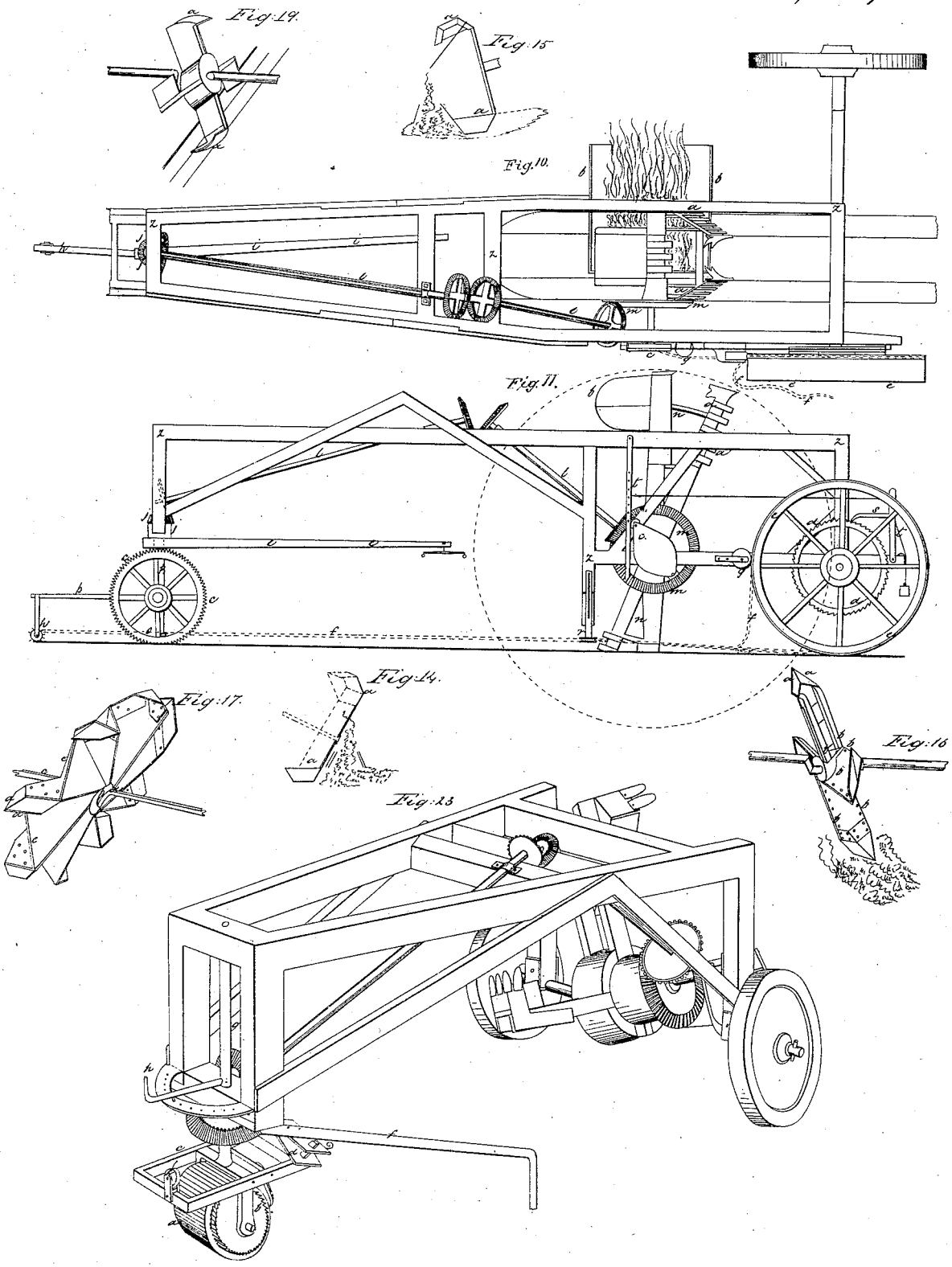

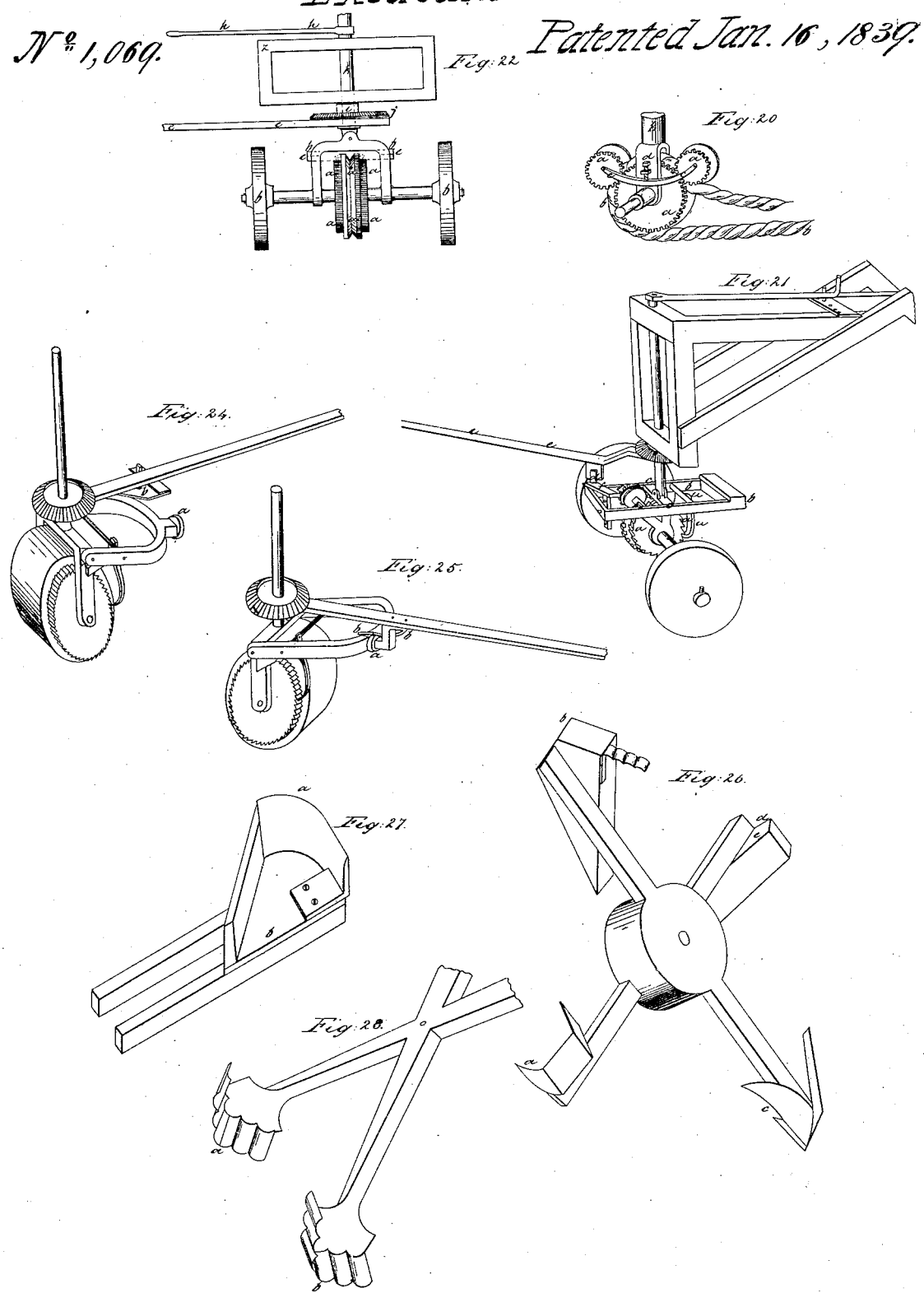

GEORGE W. CHERRY, OF WASHINGTON, DISTRICT OF COLUMBIA.

MACHINE FOR EXCAVATING AND REMOVING EARTH FOR DITCHING AND OTHER PURPOSES.

Specification of Letters Patent No. 1,069, dated January 16, 1839.

*To all whom it may concern:*

Be it known that I, G. W. CHERRY, of Washington, District of Columbia, have invented a new and useful machine for excavating earth, to be used chiefly in ditching and embanking for fencing and in draining of lands, which I call "the rotary ditcher," and of which the following is a correct description.

The machine consists chiefly in a wheel with cutters upon the periphery to shape the bottom of the ditch and cutters on the sides to shape the sides of the ditch, a simple form of which is represented in Figure 1 of the annexed drawings; $d\ d$ the inclined side cutters, and $e\ e$ the bottom cutters. These scraper buckets are placed either in a line with each other, as in Fig. 1, or they are placed sidewise of each other, as at $a\ a$, Fig. 3, for the widening of the ditch by successive cuttings. Or instead of a wheel with a rim a number of arms revolving upon a common center are used without a rim, having cutters on the ends for the shaping of the bottom of the ditch and cutters on the sides for shaping the sides of the ditch, as represented in Figs. 4 and 7. When four arms are used, one of them is so attached as to be removed at pleasure, for the greater convenience in traveling. The arms are of any convenient number and are connected with frames corresponding with the shape of the ditch, as at $b\ b$, Fig. 4, or $a\ a$, Fig. 7, and metallic plates or other formed cutters are bolted upon the frames for the shaping of the ditch. The cutters are continuous or of the extent of the side or bottom of the ditch, as at $c\ c\ c$, Fig. 4, or they are divided into gouge or chisel-like sections, as at $d\ d$, or in point or plow-like sections, as at $e\ e\ e$. The sectional cutters are either combined with and bolted upon steel continuous cutters, as at $a\ a$, Fig. 5, or they are bolted upon the frame, as at $f\ f\ f$, Fig. 4, or at $a\ a$, Figs. 10 and 11. When the sectional cutters are used upon the frames successively, they are placed in different positions upon them alternately, as at $c\ c\ c$ and $c\ c\ c\ c$, Fig. 9, so that in excavating the parts of earth left most projecting by one set are cut deepest by the set succeeding, or the same effect is produced by the bending out and in of continuous cutters, so placed upon the arms as that their projections revolve in different positions alternately. See Fig. 28 $a$ and $b$.

The side cutters are placed upon the same frame with the bottom cutters, as is Fig. 5, or are attached to separate frames, as at $b\ b$ and $a$, Fig. 6, or instead of being wholly attached to the wheel or arms the upper parts of the side cutters are placed upon the frame of the carriage within which the wheel or arms revolve, as at $a\ a$ and $b$, Fig. 7.

The earth is discharged by inclined or horizontal endless aprons moving upon rollers, one placed under the buckets and the other over the embankment, as at $b\ b$, Fig. 2, or it is discharged by slides or inclined planes extending out from under the buckets, as at $h$, Fig. 4, and in the Figs. 8 and 9. The slides either revolve with the wheel, as at $h$, Fig. 4, or they are stationary, as at $b\ b$, Figs. 9 and 10, or they are in two parts, as at $a\ a$, Fig. 8, the one stationary and the other revolving. The slides are single and throw the earth on one side, as at $h$, Fig. 4, or are double and throw the earth on both sides as at $c\ c$, Fig. 6. If in any case the earth fails to fall with sufficient readiness, it may be jarred off by the falling upon the buckets of the oblong weight $a$, Fig. 12, as it turns with the uprights $d\ d$ upon the points $b\ b$ in the revolving of the wheel, it being prevented from falling backward by the support $c$. By giving less inclination to the cutters on the side next the embankment, as shown by the frame $a\ a$, Fig. 13, and extending the bucket back to a greater distance and slanting the side $b\ b$ toward the side $c\ c$ next the embankment the slide $d$ may be more vertical and the earth be more readily discharged in the excavating of a wider ditch.

The ditching buckets with their bottom and both side cutters as aforesaid may be attached to inclined arms or wheels, as at $a\ a$, Figs. 14 and 15. To wheels or arms inclined to the slant of one side of the ditch the buckets are attached with side cutters only of the opposite side, in combination with the bottom cutters, as at $a\ a$, Figs. 16, 17 and 18 and 26 and 27 and 28 and 23, in either of which cases the slant of one side of the ditch is given by the inclination of the circle in which the bottom cutters revolve.

The cutters are either straight across on the edges, as at $b\ b\ b$, or oblique, as at $a\ a$, or zigzag, as at $e\ e$, or are in sections, as at $c\ c\ c$, Fig. 18, or they are circular, as at $a$, Figs. 26 and 27 and 19, or the scrapers are in separate sections, as in Fig. 26, $a$ representing a sectional scraper for excavating of one half of the ditch and b the scraper for excavating the opposite side and c representing a plow-like scraper for cutting the earth from one side of the ditch and throwing it over on the other, and d the scraper for cutting the other side and e the elevator in combination with it to bear up and discharge the earth.

The arms are either broad enough to form the bearers or elevators back of the scrapers, as in Figs. 16, 17, 18 and 19, or the bearers are placed upon the ends of the arms, as at b, Fig. 27, or they extend back of the arms as the elevators of the vertical wheel aforesaid. The arms are either placed upon the axle in a line parallel to their axis, as at d d, Fig. 18, or made to form a diagonal line with the axis, as at b b, Fig. 16. As the scrapers connected with the arms placed diagonally rise from the ditch the earth falls back upon the arms or elevators and is borne up and over the side of the ditch by them and thrown and pressed over into an embankment. As the scrapers connected with the arms set parallel to the hub rise from the ditch the earth falls from the scrapers mostly back upon the arms or elevators, and the balance falls from the edge of the scrapers upon the ground nearest the ditch, and as the elevators still rise in their inclined circuit the earth falls from their edges farther and farther from the ditch, until all is discharged in the forming of an embankment. By combining inclined arms with cutters at or nearly at right angles with them, on their ends, as at a a, Fig. 19, they excavate a ditch in or nearly in the shape of the letter V.

The axle of the inclined wheel or arms is either inclined, as in Fig. 14, so as to be perpendicular to the face of the wheel, or is bent down from a horizontal line to the inclination desired, and bent up again from the lowest point of the inclination to the said horizontal line, as at c d, Fig. 17.

The ditching wheel or arms are attached to a carriage and operated as represented in Figs. 10 and 11 and 23, the scrapers excavating from the bottom of the ditch forward and upward to the top of the ditch as the wheel or arms revolve. The frame of the carriage consists chiefly in two bottom pieces and four upright posts and two plates extending forward to a line perpendicular with the front axle, and there supported by two perpendicular posts connected at the top and bottom by cross pieces, which rest upon shoulders of a perpendicular shaft k, passing through them, and branching out below and resting upon the axle of the front wheels, as represented in Figs. 11, 21 and 22. z z z, the frame; k k k, the perpendicular and branching shaft.

The sweep to which the horse is attached is connected with a cylinder and cog-wheel revolving upon the lower end of the perpendicular shaft. Said cog-wheel turns the line shafts, which convey the power to a cog-wheel attached to the revolving wheel or arms, as represented in Figs. 11, 21 and 22. e e, the sweep; i, the cylinder; j, the cog-wheel; l l, the line shafts; m m, the cog-wheel upon the revolving wheel or arms.

The perpendicular shaft k aforesaid is used to direct the front wheels with by means of a guide extending back from it to a perforated cross-piece attached to the plates as represented in Figs. 21 and 22, k, the shaft; h h, the guide; w, the cross-piece.

The carriage is drawn ahead by front wheels having points or cutting projections on their peripheries to cut the sward and to guide and draw the machine. The wheels are made to revolve with the axle by ratchet wheels fixed upon the same axle with them. The ratchet wheel is worked by a pawl extending down from an oblong frame balancing upon pins connecting it in the center with the branches of the shaft aforesaid, and the said frame is vibrated by a friction roller attached to the under side of the sweep as it passes over an inclined plane upon one end of the frame. c c, Fig. 11, the points upon the wheels; a a, Figs. 21 and 22, the ratchet wheel; u u, the pawl; b b, the oblong frame; c c, the pins; f, the inclined plane; d, the friction roller; e e, the sweep. Or instead of being drawn by the front wheels, as aforesaid, the wheels revolve upon the axle and the carriage is drawn forward by the rolling in of a rope between grooved cog-wheels, the largest of which wheels a' a', Fig. 22, is placed between the ratchet wheels a, and the two smaller wheels revolve in bearings connected with the branches of the perpendicular shaft by means of a set screw passing through a projection upon the side of said branches and elevating and depressing the bearings, so as to bring the smaller wheels more or less closely in contact with the periphery of the larger wheel, and the rope passing between them and fastened ahead, as represented in Fig. 20. k, the perpendicular shaft; a a a, the grooved cog-wheels; c c, the bearings; d, the set screw, and b b the rope. Or the carriage may be drawn ahead and guided by means of a rope fastened to a point ahead and passing between friction rollers placed under the front end of the tongue, which is attached to the front axle in a manner similar to that in which the tongues of other carriages are attached to their axles, and from the rollers aforesaid the rope passing between other friction rollers suspended from the center of the front axle, and from thence betwen rollers suspended from the frame directly in front of the hind wheel nearest the ditch, and the rope then passing around in a groove made in the periphery of said wheel, and prevented from slipping by a friction roller pressing against it and revolving in a stirrup attached to the frame of the carriage. Said wheel is turned by a ratchet placed upon its side and worked by a pawl connected with levers which are vibrated by means of a cam fixed upon the end of and revolving with the shaft of the revolving wheel or arms, as represented in Figs. 10 and 11. $f$ $f$, the rope; $p$, the tongue; $p$, $o$, $r$, $q$, the friction rollers; $e$, the wheel; $d$ $d$, the ratchet; $s$, the pawl; $t$ $t$, the vibrating levers; $c$, the cam. Or only one front wheel is used, as in Fig. 23, and the ratchet by which the wheel is moved is operated by the vibrating frame, as specified, with this difference, that the inclined plane is attached to the sweep and the friction roller to the frame. $a$, the front wheel; $b$, the ratchet; $c$, the vibrating frame; $d$, the inclined plane; $e$, the roller; $f$, the sweep. Or the vibrating frame by which the ratchet is operated extends out only in one direction, as in Figs. 24 and 25, and is elevated either by the roller $a$, Fig. 25, rolling under the inclined plane $b$ $b$, or by the inclined plane $b$, Fig. 24, passing under the roller $a$.

I claim as my invention:

1. The inclined side cutters for shaping the sides of a ditch, separately, and in combination with the bottom cutters for shaping the bottom, as herein described.

2. The combining of cutters or scrapers of the various forms herein described, and as represented in the drawings at Figs. 14, 15, 16, 17, 18, 19, 23, 26, 27 and 28, with an inclined wheel or arms and bearers or elevators as herein specified, whether the axle on which the wheel or arms revolve be inclined or bent as herein set forth.

3. The sectional cutters separately or without being combined continuous cutters, and the placing of them in different positions on the frames alternately as herein described, or the placing of continuous bent cutters in different positions upon the arms alternately, so that the parts of earth left most prominent by the projections of one scraper are cut the deepest by those of the next, as specified.

4. The combining of the sectional cutters or teeth with the continuous bottom cutters and in placing of them in different positions thereon as specified and shown at Fig. 9.

5. The combining of plow-like or other formed cutters or breakers up of earth for shaping either the bottom or sides of the ditch, with arms or frames separate from those bearing the elevating buckets, as described.

6. The placing of the scraper buckets to the right and left of the center for the widening of the ditch by successive cuttings as described.

7. The wheels with points or cutting projections on their peripheries for cutting the sward and guiding and drawing the machine as herein described.

8. The combining of grooved cog-wheels for the purpose of rolling in a rope, in drawing the machine forward, as herein described.

9. The combining of weights with the buckets for the jarring out of the earth, by falling against them while they are passing over the slide, as herein described.

10. The mode of actuating the ratchets by means of the roller attached to the horse-sweep, passing over the inclined plane on the frame to which the pawls are attached as herein described, or by means of the inclined plane attached to the horse-sweep, passing over the roller on the frame to which the pawl is attached, as herein set forth.

11. The double slide, for throwing the earth on both sides of the ditch, as shown in Fig. 6.

12. The side cutters attached to the frame in which the rotary excavator revolves, which form the upper part of the sides of the ditch, in combination with a rotary ditcher as herein described and shown at Fig. 7.

13. The ratchet wheel, as herein described, for giving an intermitting forward motion to the machine, in combination with the device of grooved cog-wheels claimed in section 8 of these claims, or in combination with a single wheel revolving upon a fixed axle as represented in Fig. 11, or with a single front wheel placed between the branches of the perpendicular shaft, and thereby directed by the guide $b$, as represented in Fig. 23.

GEO. W. CHERRY.

Witnesses:
LINTON THORN,
C. H. WILTBERGER.